UNITED STATES PATENT OFFICE.

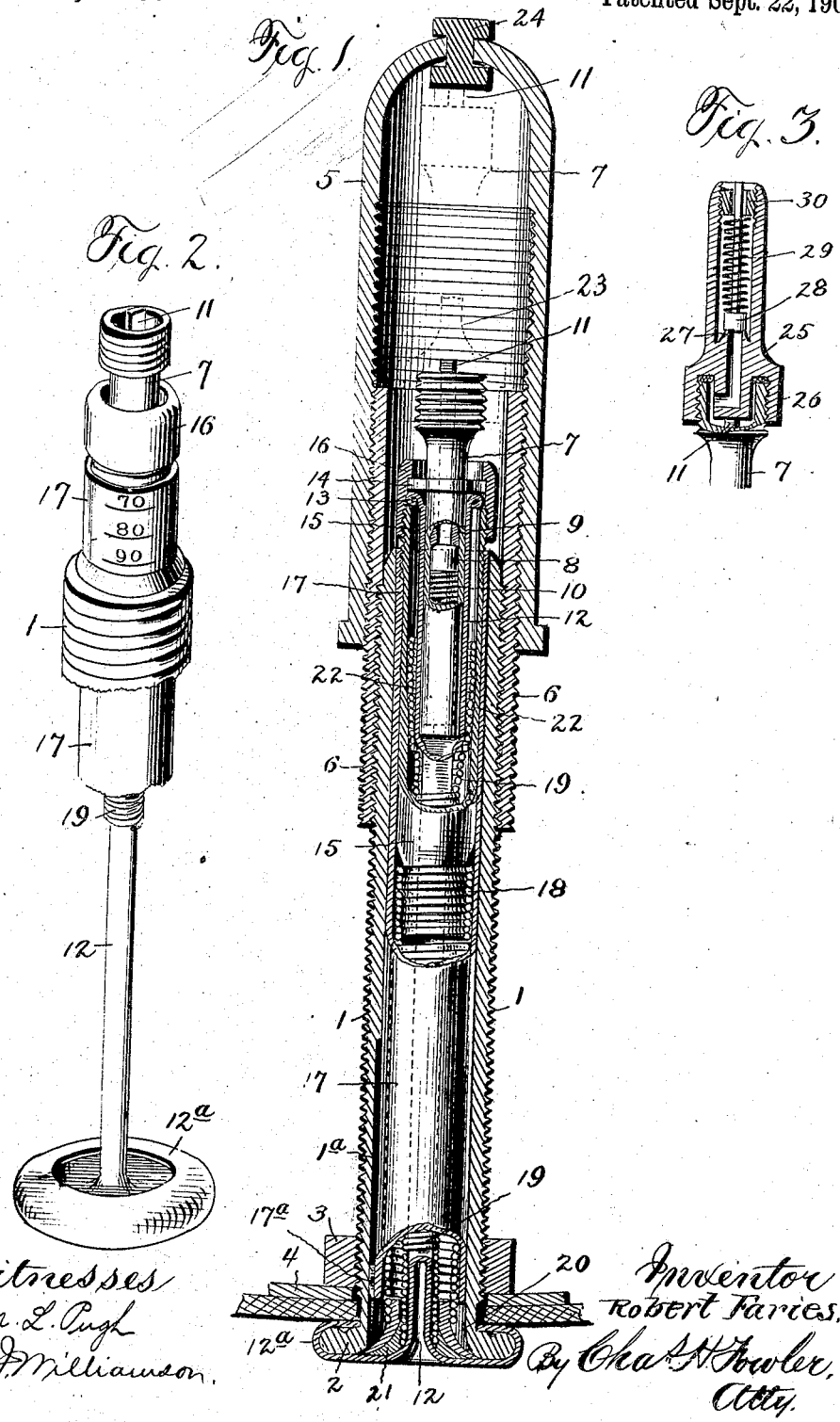

ROBERT FARIES, OF WILLIAMSPORT, PENNSYLVANIA, ASSIGNOR OF ONE-HALF TO JOHN LUPPERT, OF SOUTH WILLIAMSPORT, PENNSYLVANIA.

PRESSURE INDICATOR AND REGULATOR.

No. 899,446.    Specification of Letters Patent.    Patented Sept. 22, 1908.

Application filed March 26, 1908.   Serial No. 423,377.

*To all whom it may concern:*

Be it known that I, ROBERT FARIES, a citizen of the United States, residing at Williamsport, in the county of Lycoming and State of Pennsylvania, have invented certain new and useful Improvements in Pressure Indicators and Regulators, and do hereby declare that the following is a full, clear, and exact description of the same, reference being had to the annexed drawings, making a part of this specification, and to the letters and figures of reference marked thereon.

My invention relates to pressure indicators and regulators, and my object is to provide a device of this description which in some of its embodiments is specially fitted for pneumatic tires, such as those used for automobiles, but which is applicable to any fluid-pressure receiving apparatus, by which the exact pressure within the tire or other apparatus may be indicated, and by which any excess of pressure may be automatically relieved, and which, as in the case of pneumatic tires, may be a permanent attachment, so that the bother or annoyance of applying, removing and caring for the indicator may be obviated, and withal to provide an absolutely efficient device of this description which will be as simple in construction as is possible with reliability, and besides these objects, I attain other objects, as will hereinafter appear, that grow out of or are in a measure incidental to the structure I have invented for my purpose as above stated, and some of which are important, irrespective of the function of my device as a pressure indicator and regulator, and for the attainment of the objects of my invention, said invention consists in a device constructed substantially as hereinafter specified and claimed.

In the drawings—Figure 1 is a vertical longitudinal section of an embodiment of my invention, especially adapted for a pneumatic tire, portions of the device being shown in elevation; Fig. 2 a detail view in perspective of the extensible and contractible connection between the valve and the tire connection, by which communication between the interior of the tire and the pressure-receiving device is maintained and pressure applied to said device, and a portion of the scale-bearing tube; and Fig. 3 a detail view in vertical section of a portion of the device shown in Fig. 1, when a different form of pressure-relieving means is employed.

In view of the fact that I have developed my invention in a form suited for pneumatic tires, and I desire to cover by my patent in addition to its broad or general features, those features of my device that are of special importance in relation to pneumatic tires, I illustrate in the drawings and shall describe such an embodiment of my invention; with the understanding that I do not thereby restrict myself in the embodiment of the broad features thereof, to its use with pneumatic tires or any particular fluid-pressure receiving or containing apparatus.

In developing my invention for and adapting it to a pneumatic tire, I use it in connection with or make it a part of the valve mechanism through which air is injected into the tire and therein retained, and I retain the externally threaded cylindrical stem or casing 1 commonly used with valves for automobile tires, which at one end has an enlargement or foot 2 that engages the interior wall of the tire tube, and together with a nut 3 and plate 4 on the outside of the tire tube, constitutes a clamp for the attachment of the mechanism to the tube. I also retain the usual dust cover or cap 5, but instead of screwing it directly upon the stem 1, I screw upon the stem 1 a sleeve or tube 6 that is threaded internally to engage the thread of the stem 1, and externally to engage the internal thread of the cap 5, so that, for a reason hereinafter appearing, the cap 5 may be situated nearer to or farther from the valve mechanism 7. The valve mechanism 7 may, as shown, be of the well known construction, having a valve head 8 which is yieldingly held to the valve seat 9 by a coil spring 10, and which has a stem 11 that protrudes beyond the outer end of the valve casing, so that pressing upon the protruding end of the stem, the valve 8 may be moved from its seat to permit the discharge of air from within the tube. The valve 8 is normally closed to prevent egress of air from within the tube, but yields inwardly to permit the ingress of air thereto, in the well known manner.

Extending from within the tire, centrally through the stem 1, is an extensible and contractible elastic tube 12, preferably but not necessarily made of rubber, which has a hollow head or flange 12ª at the inner end which fits over the foot 2 of the stem 1, whereby it is firmly secured to the latter at the tire end, and at its outer end said rubber tube 12 is attached to the valve mechanism 7 by having the casing of the latter inserted for a portion of its length into the tube, and a flange or rim 13 on the outer end of the tube clamped between a shoulder 14 on the valve casing and the outer end of a metal tube 15, the tube 15 at such end being externally threaded for engagement by the thread of a clamping nut 16. By means of the rubber tube 12, the valve mechanism 7 is placed in communication with the interior of the pneumatic tire, so that air passing inward through the valve will enter the tire, and so that pressure from within the tire will be transmitted outward to the valve, and if the outward pressure be unopposed, the valve mechanism will move outward, the rubber tube elongating to permit the outward movement of the valve mechanism, and of course at all times maintaining the communication between the interior of the tire tube and the valve mechanism.

It will be evident that the longitudinal movement of the valve mechanism under the pressure within the tire tube, may be utilized to indicate the pressure therein, and to so utilize it, I attach to the tube 15 a tube 17, by means of the screw thread on the outer end of the tube 15, which tube 17 has an external diameter to closely and slidably fit the interior of the stem or casing 1, and I place on the exterior of said tube 17, a suitable scale, or graduation marks, which by coöperation with the top or outer end of the stem or casing 1, indicates the pressure within the tire tube. In order to enable the outer end of the casing or stem 1 to better serve as an index for the scale, I bevel the outer end of the stem or casing 1 as shown, so as to reduce the surface thereof immediately contiguous to the surface of the scale-bearing tube 17. A key 17ª on the tube 17, engaging a longitudinal groove 1ª in the stem, prevents the tube 17 turning, while permitting it to slide. Of course the resistance which the rubber tube offers to outward movement of the valve, enables said tube to offer some of the opposing pressure that is necessary in a pressure indicator, but I preferably supplement the resistance which the rubber tube offers, by means of two coil springs 18 and 19, respectively. The coil spring 18 passes partially through the tube 17, and has its inner end firmly and stationarily secured by being screwed upon the smaller end of a flaring ring or shoe 20 whose larger end overlaps and is supported against outward movement by the foot 2 of the stem or casing 1, and the outer end of the spring 18 is screwed on the threaded inner end of the tube 15, to which, it will be remembered, the valve mechanism 7 and the scale-bearing tube 17 are attached, so that there is an inward pull by the spring 18 upon the valve mechanism through the tube 15. The other coil spring 19 closely surrounds the rubber tube 12 from its inner end outward, and the inner end of said spring 19 is firmly fixed or secured in place by being screwed into the smaller end of a flaring ring or shoe 21 which is seated within the ring or shoe 20, and the outer end of the spring 19 is enlarged in diameter so as to engage a shoulder or stop formed by an outwardly tapering enlargement 22 of the interior of the tube 15, so that when the tube 15 moves outward under pressure, it will carry with it the outer end of the coil spring 19, and thereby elongate the latter. By this arrangement, the connection between the spring 19 and the tube 15 is a loose one, that is to say, there is no positive joining of them, so that the assemblage of the parts is thereby facilitated, and yet a sufficient connection exists between them so that the spring 19 is elongated when the valve mechanism moves outward under pressure.

It will be seen that with the arrangement illustrated in Fig. 1, where the valve stem 11 protrudes beyond the valve casing 7, the valve stem 11 may be caused to contact with the outer end of the dust cap 5, and thereby the valve 8 pushed inward off its seat to allow the escape of air from within the tube, and it will be evident that by adjustment of the cap 5, either by screwing it upon the tube or sleeve 6, or by screwing the sleeve or tube 6 along the stem or casing 1, the point at which the discharge of excess or undesirable pressure will take place, may be regulated. If the automatic discharge of pressure from within the tire be not desired, the ordinary valve cap 23 shown in dotted lines in Fig. 1, may be applied to the valve casing 7, and when said cap is so applied, the tension of the rubber tube and springs upon the valve mechanism may be taken off and the indicator thus rendered inactive by screwing the cap 5 far enough inward to bring its outer end against the outer end of the valve cap 23. Preferably the outer end of the dust cap 5 is provided with a plug 24 for contact either with the valve stem 11 or the valve cap 23. Instead of the automatic release of pressure by moving the valve 8 off its seat in the manner I have described, a relief valve such as shown in Fig. 3 may be employed, which consists of a casing 25 having at one end an internally threaded portion 26 adapted to be screwed upon the outer end of the valve casing 8, having a valve seat 27 for a puppet valve 28 that is yieldingly held to its seat by means of a spiral spring 29 whose tension may be adjusted by a nut 30 to determine the pressure at which the valve will be lifted from its seat to enable the escape of air from within the tire.

In view of the fact that the valve mechanism 7 is not attached to the tire rim, as is customary, but is indirectly connected to the tire through the tube 12, it will be seen that the valve mechanism may be removed whenever it may be necessary for repairs or otherwise, without taking the tire from the rim, it being necessary merely to connect and disconnect the valve mechanism with the outer end of the rubber tube 12, and this is one of the features of my invention that I cover herein, whether or not it is used as a part of a pressure indicator.

A very important feature of my invention, so far as its indicating the pressure in the tire is concerned, is that it indicates the actual pressure within the tire, since it is operated by the pressure from within the tire, whereas in the case of an indicator which shows the pressure in the tank or other source of compressed air, there is a substantial difference, say from 12 to 20 pounds, between the pressure indicated and that within the tire, because a portion of the pressure is utilized to displace the valve which is held to its seat by a spring.

What I claim is—

1. The combination of movably mounted valve mechanism, comprising a valve and its seat, the valve being movable to and from its seat, and pressure-indicating means for showing varying pressures, operated by the movement of said mechanism.

2. The combination of movably mounted valve mechanism, comprising a valve and its seat, the valve being movable to and from its seat, means for placing said mechanism in communication with the pressure-containing structure, at all points in the movement of said mechanism, and indicating means for showing varying pressures, operated by the movement of said mechanism.

3. The combination of a stem or casing, adapted to be attached to a fluid-pressure receiving structure, a valve mechanism movably mounted in said casing, comprising a valve and its seat, to and from which the valve is movable, and indicating means for showing varying pressures within said structure, operated by the movement of said mechanism.

4. The combination of a stem or casing adapted to be attached to a fluid-pressure receiving structure, an inwardly opening valve mechanism movably mounted in said casing, an extensible and contractible connection between said valve mechanism and the interior of the pressure-receiving structure, and indicating means operated by said valve mechanism.

5. The combination of movably mounted valve mechanism, comprising a valve and its seat, the valve being movable to and from its seat, pressure-indicating means for showing varying pressures operated by the movement of said mechanism, and automatic means for relieving excess pressure.

6. The combination of movably mounted valve mechanism, comprising a valve and its seat, the valve being movable to and from its seat, pressure-indicating means for showing varying pressures, operated by the movement of said mechanism, and automatic means for moving the valve from its seat under an excess of pressure.

7. The combination of a stem or casing adapted to be attached to a fluid-pressure receiving structure, an inwardly opening valve mechanism movably mounted in said casing, an extensible and contractible connection between said valve mechanism and the interior of the pressure-receiving structure, indicating means operated by said valve mechanism, and a spring opposing the movement of the indicating means by pressure on the valve mechanism.

8. The combination with a pneumatic tire, pressure-indicating means, and means for operating the pressure-indicating means, comprising a movable part, receiving pressure from within the tire, and an expansible and contractible tube connected to said part and to the tire, and establishing communication between the interior of the tire and said part.

9. The combination with a pneumatic tire, of a pressure indicator comprising a slidable tube and a tube attached to the tire, an elastic tube attached to said slidable tube and leading from the interior of the tire and having a head or flange, and means for clamping said head or flange to the tire.

10. The combination with a pneumatic tire, of a pressure indicator comprising a tube or casing attached to the tire for showing varying pressures within the tire, and a member slidably connected with said tube or casing, having a pressure-receiving part in communication with the interior of the tire.

11. The combination of movably mounted valve mechanism, comprising a valve and its seat, to and from which the valve is movable, pressure indicating means operated by the movement of such mechanism, a spring yieldingly opposing the movement of the indicating means by pressure, and means to positively prevent movement of the indicator by pressure on said mechanism.

12. The combination of movably mounted valve mechanism, comprising a valve and its seat, to and from which the valve is movable, pressure indicating means operated by the movement of such mechanism, a spring yieldingly opposing the movement of the indicating means by pressure, and a screw cap adapted to engage the valve mechanism and hold it from movement by pressure.

13. The combination with a pneumatic tire, of a pressure indicator comprising a slidable tube and a tube attached to the tire, a valve mechanism attached to said slidable tube comprising a valve and its seat, to and from which the valve is movable, an elastic tube attached to said slidable tube and leading from the interior of the tire and having a head or flange, and means for clamping said
5 head or flange to the tire.

14. The combination of a pressure indicator having a spring acting yieldingly in opposition to pressure to move the indicator, and means to positively hold the indicator from movement by such pressure.

In testimony whereof I affix my signature in presence of two witnesses.

ROBERT FARIES.

Witnesses:
H. W. WHITEHEAD,
C. G. SPROUL.